United States Patent [19]
Der et al.

[11] Patent Number: 5,929,836
[45] Date of Patent: *Jul. 27, 1999

[54] MEDIA PIPELINE WITH MECHANISM FOR REAL-TIME ADDITION OF DIGITAL VIDEO EFFECTS

[75] Inventors: Harry Der, Billerica; Barry Horne, Acton, both of Mass.; Jeffrey Kurtze, Nashua, N.H.

[73] Assignee: Avid Technology, Inc., Tewksbury, Mass.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/905,255

[22] Filed: Aug. 1, 1997

Related U.S. Application Data

[63] Continuation of application No. 08/610,570, Mar. 8, 1996, Pat. No. 5,654,737, which is a continuation of application No. 08/214,605, Mar. 18, 1994, abandoned.

[51] Int. Cl.[6] ............................................. G09G 5/00
[52] U.S. Cl. ............................................. 345/113; 348/584
[58] Field of Search ................................. 345/112, 113, 345/114, 115, 116, 120, 202; 348/578, 584, 586

[56] References Cited

U.S. PATENT DOCUMENTS

| | | | |
|---|---|---|---|
| 5,121,210 | 6/1992 | Hirayama | 358/183 |
| 5,654,737 | 8/1997 | Der et al. | 345/113 |

*Primary Examiner*—Regina Liang
*Attorney, Agent, or Firm*—Wolf, Greenfield & Sacks, P.C.

[57] ABSTRACT

Two channels of output of sequences of digital still images are input to a DVE system which has pipelined memory circuits rather than frame buffers. The DVE system includes a DVE unit which performs arbitrary three-dimensional, digital video effects on the two channels of input to provide a composite output sequence. The DVE system thus operates on sequences of digital still images rather than video signals. The DVE system is also adapted to prevent output upon receipt of a control signal, which may indicate that an output pipeline is full. The DVE system also provides a control signal to prevent input when it cannot receive input or it is not providing output.

18 Claims, 4 Drawing Sheets

MEDIA PIPELINE WITH MECHANISM FOR REAL-TIME ADDITION OF DIGITAL VIDEO EFFECTS

This application is a continuation of application Ser. No. 08/610,570, filed Mar. 8, 1996, now U.S. Pat. No. 5,654,737 entitled MEDIA PIPELINE WITH MECHANISM FOR REAL-TIME ADDITION OF DIGITAL VIDEO EFFECTS, now pending, which is a file wrapper continuation of Ser. No. 08/214,605, filed Mar. 18, 1994, now abandoned.

BACKGROUND OF THE INVENTION

Technology for manipulating digital video has progressed to the point where it can be readily processed and handled on computers. For example, the Avid/1 Media Composer, available from Avid Technology, Inc. of Tewksbury, Mass., is a system wherein digital video can be readily captured, edited, and displayed for various purposes, such as broadcast television and film and video program post-production.

The Avid/1 Media Composer uses a media pipeline to provide real-time digital video output on a computer display. This media pipeline 30 is shown in FIG. 1 in is described in more detail in U.S. Pat. No. 5,045,940, issued Sep. 3, 1991. In this media pipeline 30, a permanent storage 40 stores sequences of digital still images which represent digital video and are played back at a rate which provides the appearance of video. The sequences of digital still images do not include any frame synchronization or other type of timing information which are typically found in television signals. The still images also typically are stored in compressed form. The stored sequences are accessed and placed in a data buffer 42 from where they are provided to a compression/decompression system 44. The output of the compression/decompression system 44 is applied to a frame buffer 46 which converts the still image to a typical video signal which is then applied to an input/output unit 48. Each of the systems 40, 42, 44, 46, and 48 in this media pipeline 30 operate bi-directionally. That is, the output process discussed above can be reversed and video signals can be input via input/output unit 48 to the frame buffer 46 where they are converted to a sequence of digital still images. The images in the sequence are compressed by compression/decompression system 44, stored in data buffer 42 and then transferred to the permanent storage 40.

In such a system, only simple effects such as cuts and fades, involving only one stream of video information, can be made. More complex, arbitrary digital video effects, however, especially three-dimensional effects, are typically provided by creating the effects using another system (described below with FIG. 2), and then storing the created effect in the permanent storage 40. A variety of systems are available for performing such three-dimensional digital video effects. Such a system is commonly called an on-line controller (OLC). An example of an OLC is found in U.S. Pat. No. 5,119,432, issued Jun. 2, 1992.

A block diagram of a typical OLC 55 is shown in FIG. 2. An OLC 55 typically uses digital video signals, which include frame synchronization and other timing information. Therefore, they typically require frame buffers such as shown at 50,54 and 56 to store the video signals being processed. The OLC 55 also includes a digital video effects DVE unit 52 which performs the desired effects. The DVE unit 52 has first and second inputs 51 and 53 which are connected respectively to outputs 57 and 59 of frame buffers 56 and 50. The DVE unit 52 has an output 61 which is connected to an input 63 of frame buffer 54. Input video sources 65 and 67, such as video tape decks, respectively provide video signal outputs 69 and 71 which are applied to inputs 73 and 75 respectively of frame buffers 56 and 50. The output 77 of the frame buffer 54 is applied to an output video storage 79, such as a video tape deck. One problem with such a typical OLC 55 is that it is not capable of being stopped during the process of creating the effect, because it operates using full-rate video signals.

Because of the complex hardware required to deal with video signals, in particular the frame buffers 50, 56 and 54, an OLC 55 is also typically expensive. Thus, producing complicated arbitrary three-dimensional video effects has not been possible in common consumer-oriented multi-media editing products.

Also, the process of preparing and editing such effects is time-consuming and, therefore, expensive. With standard OLCs, an effect is created by preparing two video tapes as input video sources 65 and 67 to provide the input video signals. These tapes must be synchronized together. Then, an output tape is prepared as the output video storage 79 to receive the output effect. The effect is then created using the DVE unit 52 by playing the input video tapes through the DVE unit 52 and recording the result on the output tape. In order for the editor to see the resulting effect, the output tape must be played back. If the result is not what is desired, the process must be repeated after appropriate adjustments are made. The repetitive recording/playing/adjusting cycle is costly.

SUMMARY OF THE INVENTION

The invention improves over the prior art by providing a media pipeline with two channels of output of sequences of digital still images which sequences are input to a DVE unit which is adapted to prevent output upon receipt of a control signal. It also provides a control signal to prevent input when it cannot receive input or when it is not providing output. The DVE unit is an improvement over the prior art by the elimination of frame buffers and the addition of memory which stores sequences of digital still images, such as a FIFO.

DETAILED DESCRIPTION

The present invention will be more completely understood through the following detailed description which should be read in conjunction with the attached drawing in which similar reference numbers indicate similar structures. All references cited herein are hereby expressly incorporated by reference.

Real-time digital video effects are provided using a media pipeline with two channels of output of sequences of digital still images, which represent video information, along with control information. Such a system can be provided by modifying the media pipeline disclosed in U.S. Pat. No. 5,045,950. The two channels of digital images are used as the inputs to a digital video effects (DVE) unit such as used in typical OLCs. Thus, the modified media pipeline reduces the costs of systems for providing these effects.

Figure 1:
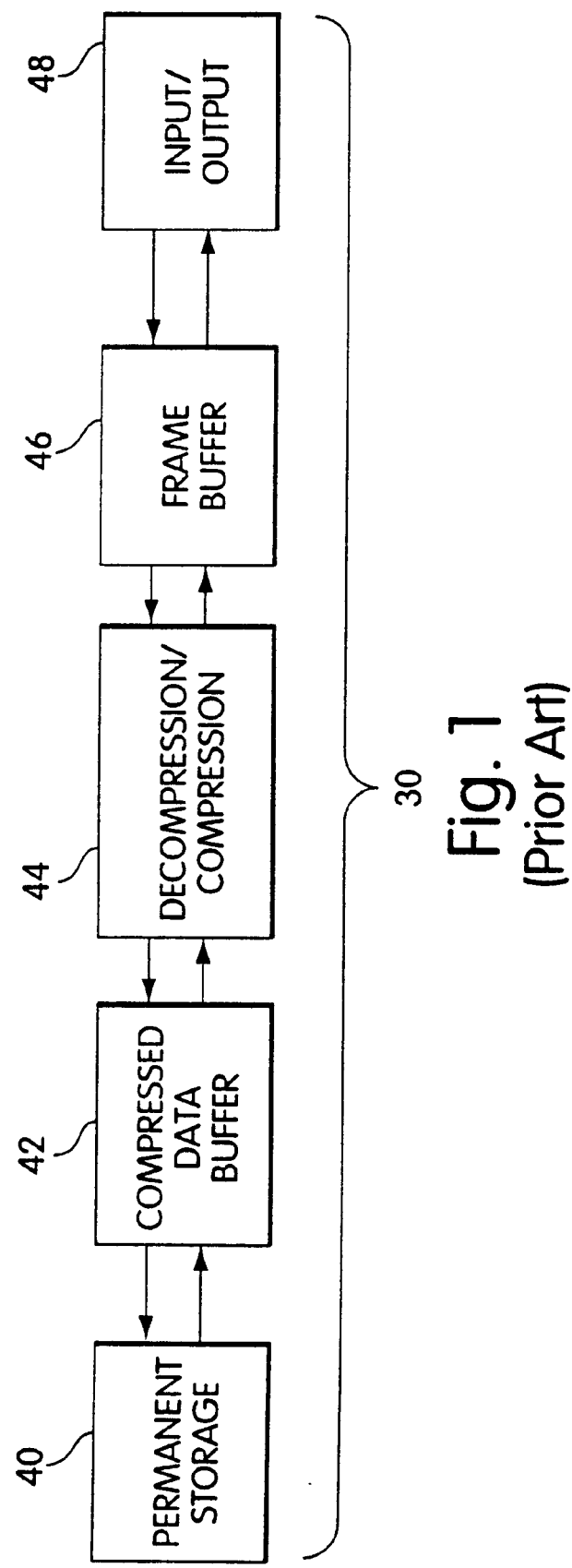
FIG. 1 is a block diagram of a media pipeline as is used in the prior art.
Figure 3:
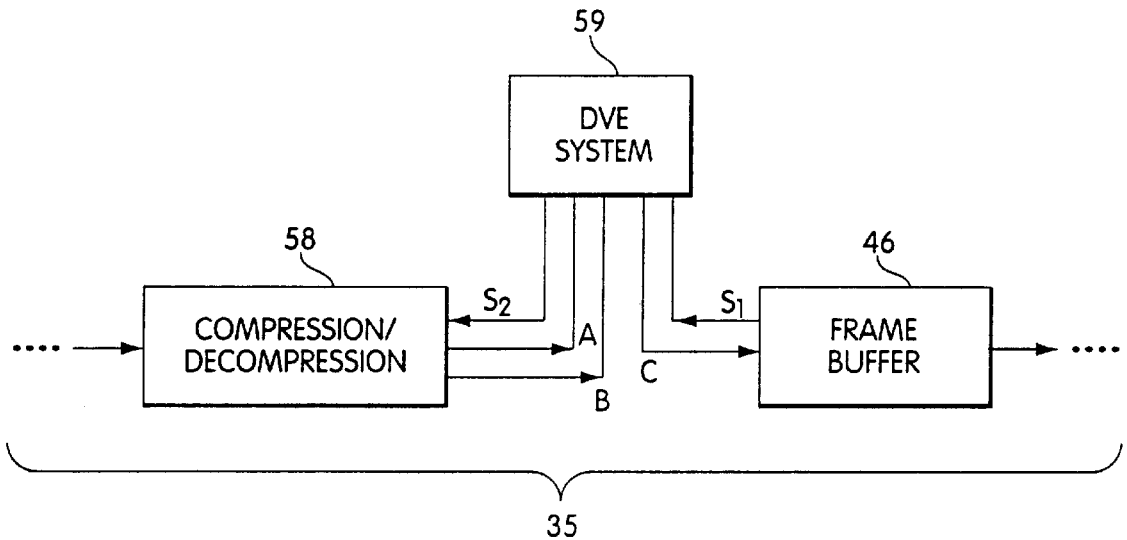
FIG. 3 is a block diagram of a modified media pipeline in accordance with the present invention.

The media pipeline 35 with real-time digital video effects will now be described in connection with FIG. 3. The media pipeline 30 shown in FIG. 1 is modified to include a compression/decompression (CODEC) unit 58 which is a modification of compression/decompression system 44. The modification made is such that it provides two outputs, indicated at A and B in FIG. 3. It is not necessary to use compressed data; however, compression may be preferable to reduce storage requirements. This modification is described in more detail in British provisional specification 9307894.7, filed Apr. 16, 1993, under U.S. foreign filing license 504287 granted Apr. 13, 1993. These changes will also be described in more detail below in connection with FIG. 4.

Figure 5:
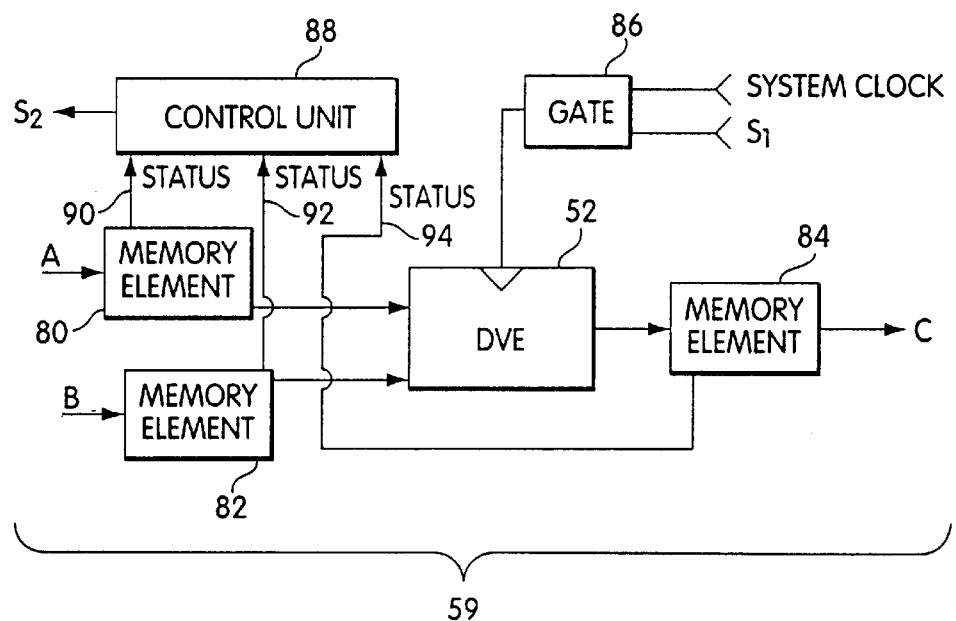
FIG. 5 is a more detailed block diagram of a modified digital video effects system in accordance with the present invention.

The OLC 55 of the prior art is also modified to create the DVE system 59 which also receives a control signal S1 from the frame buffer, and provides a control signal S2 to the CODEC unit 58. These modifications will be described in connection with FIG. 5.

Figure 2:
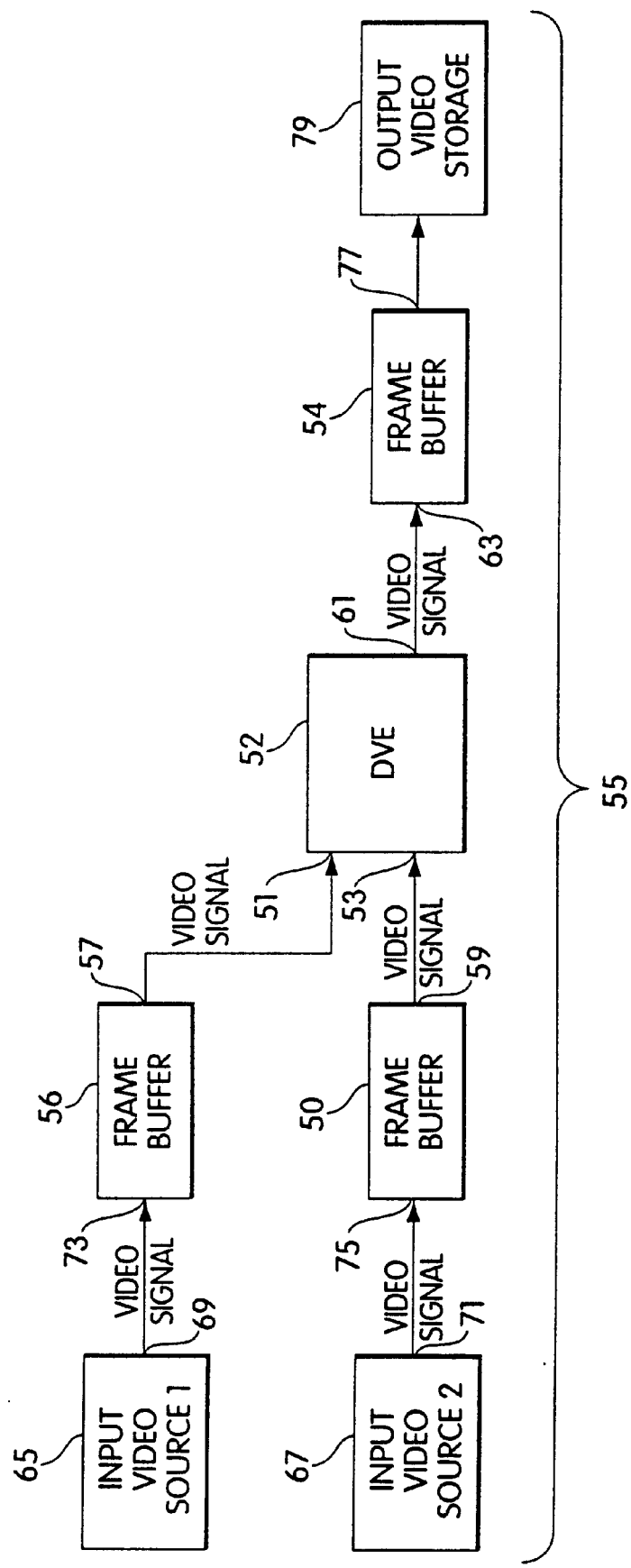
FIG. 2 is a block diagram of a conventional on-line controller for producing special effects from video signals.

In this modification, frame buffers 50, 54 and 56 of OLC 55 (FIG. 2) are replaced with memory elements 80, 82 and 84, which are preferably first-in, first-out (FIFO) elements. These memory elements 80, 82, 84 (FIG. 5) do not need to be a large as the replaced frame buffers. For example, frame buffers typically hold several hundred thousand samples (wherein a sample represents a pixel) to represent each pixel in a frame. An image of 640 by 480 pixels thus requires a frame buffer which stores about 300K pixels. In contrast, the memory elements 80, 82 and 84 need only hold several thousand samples, e.g., about 2000.

Each memory element 80, 82, 84 has a respective status line 90, 92, and 94 connected to a control unit 88. The control unit 88 is provided to ensure that digital images are accessed from a memory unit (described below) in the CODEC unit 58 and stored in the memory elements 80 and 82.

The control signal Si indicates that the pipeline downstream from DVE unit 59 is almost full and that no further data should be output. This mechanism is described in more detail in U.S. Pat. No. 5,045,940. This signal S1 is used by the DVE unit 52 to temporarily halt processing, or to continue processing but temporarily disable output. The DVE unit 52 is controlled by a system clock to perform sequential operations on the input sequences as is known in the art. Processing is stopped in response to signal S1 by gating the system clock signal with the signal S1 using a logic gate 86. The output signal S2 to the CODEC 58 is generated by control unit 88 either when the DVE 52 is processing at capacity and cannot accept further data, or whether it has stopped processing due to receipt of a "WAIT" signal from the frame buffer 46. For example, the signal S2 is sent when the input FIFO memory elements 80 and 82 are full or almost full. The detection of such a status may be performed using the status lines 90, 92 or 94 or by monitoring read and write accesses to the memory elements with a counter. Such modifications to a digital video effects system 59 are straightforward.

Figure 4:
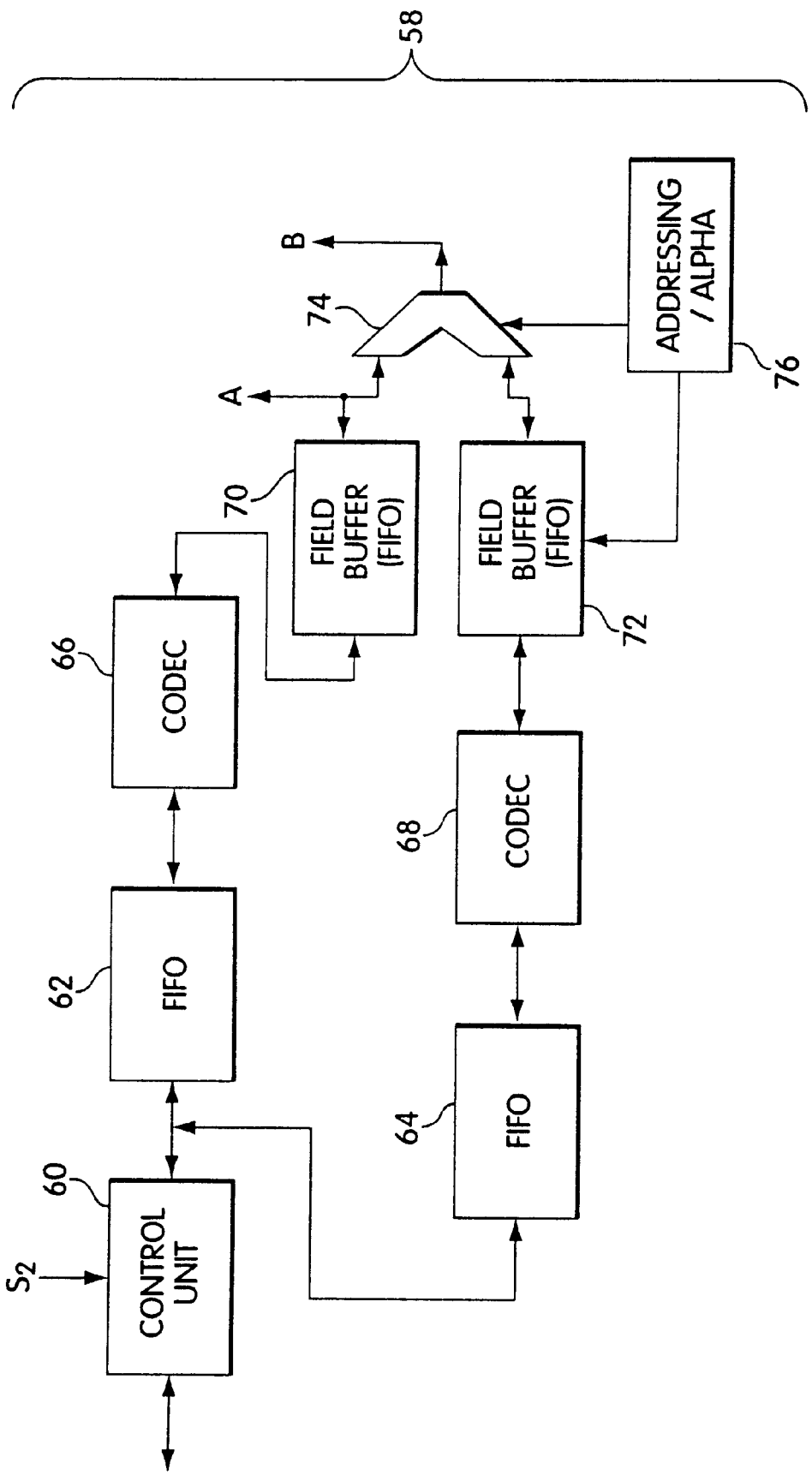
FIG. 4 is a more detailed block diagram of a modified compression/decompression subsystem of the media pipeline in accordance with the present invention.

The modified CODEC unit 58 described in British Provisional Application 9307894.7 will now be described in connection with FIG. 4. In this figure, a control unit 60 controls two channels of coder/decoders. The modification to the media pipeline 30 is made by assigning, the control unit 60, different sections of the compressed data buffer 42 to each channel. A sequence is also assigned to a channel. Thus, when the sequence is read into the compressed data buffer 42, it is input to the section assigned to the channel for that sequence. Thus, reading and writing of data into the FIFO 62 and 64 for the CODECs 66 and 68 is based on the assignment of a channel to a selected sequence of still images.

Each channel has a separate CODEC, either a first CODEC 66 or a second CODEC 68. Each CODEC has a respective first-in, first-out memory (FIFO) 62 and 64. The FIFO's 62 and 64 feed respectively to the CODECs 66 and 68 of which the outputs are applied to field buffers, which are also preferably FIFOs 70 and 72. These two channels may be blended using a blender 74 which is controlled in accordance with some addressing and alpha information 76. For the purposes of this invention, however, no blending is performed. Thus, a first output sequence is provided by output A from the FIFO 70 for CODEC 66. A second output sequence is then provided on the output of the blender, as the output B. Thus, FIFO 70 and blender 74 act as first and second sources of sequences of digital still images. The outputs A and B are applied to the digital video effects system 59 as shown in FIG. 3. The CODEC 58 receives control signal S2 from the digital video effects system 59 by its control unit 60. The control unit 60 appropriately fills the pipelines for CODECs 66 and 68 and stops or starts output as may be necessary. For example, it should be understood that a read signal to FIFOs 70 and 72 causes a write signal to be applied to memory elements 80 and 82.

With the modifications described above, this system 35 can therefore be readily connected to any digital video effects system 59 based on an OLC 55 which has been appropriately modified to handle pipeline control signals and sequence of digital still images. Accordingly, this invention reduces the costs in providing real-time digital video effects as well as the cost of the digital video effects systems.

Because this system operates using a media pipeline which provides sequences of digital still images, rather than a video signal, display and generation of effects can be stopped at any time. Thus, an editor can stop and view an arbitrary pixel in the created effect. Also, an editor can step forward or backward, frame-by-frame, through the effect, by virtue of the pipelined nature of the system. There is no longer any need to create and view video tapes of desired arbitrary three-dimensional video effects.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A peripheral circuit for connection to a computer system for generating video effects from first and second sequences of digital still images stored on the computer, comprising:

a first memory for receiving the first sequence of digital still images;

a second memory for receiving the second sequence of digital still images;

an effects circuit for receiving data for the first and second memories and for combining the first and second sequences of digital still images according to an effect to provide as an output a third sequence of digital still images; and a control unit permitting operation of the effects circuit to output data defining a still image in the third sequence of digital still images, wherein still images in the third sequence are output at a rate according to an input defining a rate of playback of the third sequence of digital still images.

2. The peripheral circuit of claim 1, wherein the first and second computer readable memories each have a capacity of less than one of the digital still images.

3. The peripheral circuit of claim 1, wherein the video effect is a composite of the first and second sequences of digital still images.

4. The peripheral circuit of claim 1, wherein the control unit includes:

means for receiving a first pipeline signal from the effects circuit indicative of whether the effects circuit can receive data defining a still image from one of the first and second memories;

means for providing a second pipeline signal to the effects circuit indicative of whether data is available in the first and second memories for the effects circuit; and means for controlling flow between the first and second memories and the effects circuit according to the first and second pipeline signals.

5. The peripheral circuit of claim 4, wherein the first pipeline signal is generated according to the user requests defining a rate of playback of the third sequence of digital still images.

6. The peripheral circuit of claim 1, wherein the control unit includes:

means for receiving a control signal having first and second states; and means for preventing output of the third sequence by the effects circuit when the control signal is in the first state and otherwise providing an output.

7. The peripheral circuit of claim 6, wherein the control signal is indicative of whether a display system receiving the third sequence of digital still images has stopped displaying the third sequence.

8. The peripheral circuit of claim 1, wherein the rate of playback of the third sequence is the full rate of the third sequence.

9. The peripheral circuit of claim 1, wherein the rate of playback is such that display of the third sequence is advanced one image at a time according to user requests.

10. A computer system for generating video effects from first and second sequences of digital still images stored on the computer, comprising:

a first memory for receiving the first sequence of digital still images;

a second memory for receiving the second sequence of digital still images;

means for receiving data for the first and second memories and for combining the first and second sequences of digital still images according to an effect to provide as an output a third sequence of digital still images; and a control unit permitting operation of the means for receiving and for combining to output data defining a still image in the third sequence of digital still images, wherein still images in the third sequence are output at a user defined rate of playback of the third sequence of digital still images.

11. The computer system of claim 10, wherein the first and second memories each have a capacity of less than one of the digital still images.

12. The computer system of claim 10, wherein the video effect is a composite of the first and second sequences of digital still images.

13. The computer system of claim 10, wherein the control unit includes:

means for receiving a first pipeline signal from the means for receiving and for combining indicative of whether the effects circuit can receive data defining a still image from one of the first and second memories;

means for providing a second pipeline signal to the for receiving and for combining indicative of whether data is available in the first and second memories for the for receiving and for combining; and means for controlling flow between the first and second memories and the for receiving and for combining according to the first and second pipeline signals.

14. The computer system of claim 13, wherein the first pipeline signal is generated according to the user requests defining a rate of playback of the third sequence of digital still images.

15. The computer system of claim 10, wherein the control unit includes:

means for receiving a control signal having first and second states; and means for preventing output of the third sequence by the for receiving and for combining when the control signal is in the first state and otherwise providing an output.

16. The computer system of claim 15, wherein the control signal is indicative of whether a display system receiving the third sequence of digital still images has stopped displaying the third sequence.

17. The computer system of claim 10, wherein the user defined rate of playback of the third sequence is the full rate of the third sequence.

18. The computer system of claim 10, wherein the user defined rate of playback is such that display of the third sequence is advanced one image at a time according to user requests.

* * * * *